United States Patent
Rochell

(10) Patent No.: US 9,380,647 B2
(45) Date of Patent: Jun. 28, 2016

(54) HEATING CONTROL UNIT COMPRISING A SENSOR, ICE PROTECTION SYSTEM AND METHOD FOR CONTROLLING A HEATER

(71) Applicant: Airbus Operations GmbH, Hamburg (DE)

(72) Inventor: Thilo Rochell, Raa-Besenbek (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 336 days.

(21) Appl. No.: 14/035,187

(22) Filed: Sep. 24, 2013

(65) Prior Publication Data

US 2014/0097177 A1    Apr. 10, 2014

Related U.S. Application Data

(60) Provisional application No. 61/711,760, filed on Oct. 10, 2012.

(30) Foreign Application Priority Data

Oct. 10, 2012 (EP) .................................. 12187935

(51) Int. Cl.
    *H05B 1/02* (2006.01)
    *B64D 15/12* (2006.01)
    (Continued)

(52) U.S. Cl.
    CPC .............. *H05B 1/0236* (2013.01); *B64D 13/08* (2013.01); *B64D 15/12* (2013.01); *G05D 23/19* (2013.01); *Y02T 50/44* (2013.01)

(58) Field of Classification Search
    CPC .. H05B 1/0236; H05B 3/0042; H05B 1/0202; H05B 1/023; H05B 2203/026; H05B 2214/04
    USPC .......... 219/202, 209, 210, 494, 497, 481, 486
    See application file for complete search history.

(56) References Cited

U.S. PATENT DOCUMENTS

| | | | | |
|---|---|---|---|---|
| 4,334,168 A | * | 6/1982 | Besson | .................... H03H 9/08 236/1 F |
| 5,093,583 A | * | 3/1992 | Mashino | ................... B60L 3/00 219/203 |

(Continued)

FOREIGN PATENT DOCUMENTS

| | | |
|---|---|---|
| TW | 486734 B | 5/2002 |
| WO | 0182018 A2 | 11/2001 |

OTHER PUBLICATIONS

European Searching Authority, European Search Report for EP12187935.7 Mailed May 6, 2013.

(Continued)

*Primary Examiner* — Mark Paschall
(74) *Attorney, Agent, or Firm* — Ingrassia Fisher & Lorenz, P.C.

(57) ABSTRACT

A heating control unit, including a controller housing is provided. The heating control unit includes a microcontroller arranged within the controller housing, with the microcontroller being configured to generate a control signal for a heater and to output the control signal via a control line to the heater. The heating control unit also includes a temperature sensor arranged within the controller housing and coupled to the microcontroller. An active sensor surface of the temperature sensor forms at least part of an outer surface of the controller housing.

19 Claims, 1 Drawing Sheet

(51) Int. Cl.
*B64D 13/08* (2006.01)
*G05D 23/19* (2006.01)

(56) References Cited

U.S. PATENT DOCUMENTS

| | | | |
|---|---|---|---|
| 6,166,353 A * | 12/2000 | Senneville | F24C 15/18 |
| | | | 126/273 R |
| 6,227,492 B1 * | 5/2001 | Schellhase | B64D 15/12 |
| | | | 244/134 D |
| 6,350,967 B1 * | 2/2002 | Scott | G05D 23/1932 |
| | | | 219/485 |
| 7,580,777 B2 | 8/2009 | Smith et al. | |
| 7,922,121 B2 | 4/2011 | Gaertner, II et al. | |
| 7,940,533 B2 * | 5/2011 | Mansfield | H02M 3/155 |
| | | | 323/222 |
| 8,344,475 B2 * | 1/2013 | Shaeffer | G11C 13/0002 |
| | | | 257/528 |
| 2009/0095842 A1 | 4/2009 | Gaertner, II et al. | |
| 2012/0132635 A1 * | 5/2012 | Mishra | G08B 17/00 |
| | | | 219/209 |
| 2013/0113284 A1 * | 5/2013 | Altonen | H02J 3/12 |
| | | | 307/31 |
| 2013/0327944 A1 * | 12/2013 | Ernst | G01J 5/046 |
| | | | 250/352 |

OTHER PUBLICATIONS

State Intellectual Property Office of the Peoples' Republic of China, Office Action for Chinese Patent Application No. 20130466783.8, mailed May 6, 2015.

* cited by examiner

US 9,380,647 B2

HEATING CONTROL UNIT COMPRISING A SENSOR, ICE PROTECTION SYSTEM AND METHOD FOR CONTROLLING A HEATER

CROSS-REFERENCE TO RELATED APPLICATIONS

This application claims priority to U.S. Provisional Patent Application No. 61/711,760, filed Oct. 10, 2012, and to European Patent Application No. 12 187 935.7, filed Oct. 10, 2012, which are each incorporated herein by reference in their entirety.

TECHNICAL FIELD

This application pertains to a heating control unit comprising a sensor, an ice protection system, and a method for controlling a heater, particularly for use in an ice protection system for an aircraft or spacecraft.

BACKGROUND

Ice protection systems for use in aircraft conventionally comprise a sensor system of temperature sensors which are locally installed at the respective components of the aircraft to be protected against ice formation. A central control unit monitors the sensors and outputs control signals to ice formation prevention devices such as heaters, ultrasound generators or mechanical surface treatment arrangements.

Such ice protection systems have a comparatively high installation complexity and complex wiring requirements.

International Publication No. WO 2005/073084 A1 discloses a modular aircraft ice protection system having a plurality of modularly arranged local control modules controlling the power supply of ice protection heating elements for use in an aircraft.

U.S. Pat. No. 7,922,121 B2 discloses an ice protection system for a vehicle employing a plurality of anti-icing and de-icing power distribution units located near the edge surfaces of a vehicle which are prone to ice accretion.

Other objects, desirable features and characteristics will become apparent from the subsequent summary and detailed description, and the appended claims, taken in conjunction with the accompanying drawings and this background.

SUMMARY

According to various embodiments, provided is an ice protection system, especially in an aircraft or spacecraft, which requires little wiring complexity, little installation complexity and minimized system weight.

According to one of various aspects of the present disclosure, a heating control unit comprises a controller housing, a microcontroller arranged within the controller housing, the microcontroller being configured to generate a control signal for a heater and to output the control signal via a control line to the heater, and a temperature sensor arranged within the controller housing and coupled to the microcontroller, wherein an active sensor surface of the temperature sensor forms at least part of an outer surface of the controller housing.

According to another of various aspects of the present disclosure, an ice protection system comprises a plurality of heating control units according to one aspect of the present disclosure and a plurality of heaters, each of the plurality of heaters being electrically connected and supplied with electrical power by a respective one of the plurality of heating control units, the heaters being configured to heat a respective component of an airborne vehicle, for example, one or more of water lines, waste water tubes, potable water tubes, servicing panels and heated floor panels.

According to another of various aspects of the present disclosure, an airborne vehicle comprises an ice protection system according to various embodiments.

According to one aspect of the present disclosure, a method of controlling a heater comprises arranging a microcontroller within a controller housing, arranging a temperature sensor within the controller housing, wherein an active sensor surface of the temperature sensor forms at least part of an outer surface of the controller housing, generating, by the microcontroller, a control signal dependent on a sensor value of the temperature sensor, and outputting, by the microcontroller, the control signal via a control line to a heater for heating a component of an airborne vehicle.

One main idea of the present disclosure is to provide for an ice protection system for use in an airborne vehicle which relies on modular heating control units. The heating control units are each integrally implemented with a temperature sensor in one housing and locally placed near the heater devices at the components to be monitored, such as water lines, waste water and potable water tubes, servicing panels, heated floor panels and similar components in an aircraft or spacecraft.

One advantage of a modular solution for an ice protection system is the reduced wiring requirements: The heating control units can be advantageously placed near the respective heaters, thus reducing the distance to the heaters to a minimum. This reduces the system weight and the installation complexity.

According to one exemplary embodiment of the heating control unit, the heating control unit further comprises power supply terminals for providing electrical power to the microcontroller and the temperature sensor, and a voltage converter coupled between the power supply terminals and the microcontroller, the voltage converter being configured to convert a voltage applied at the power supply terminals to an operating voltage of the microcontroller. This provides the advantage of not having to supply the modular heating control units with separate power, but instead being able to connect the heating control units to a standard power supply already existent in common airborne vehicles.

According to another exemplary embodiment of the heating control unit, the voltage converter is a mains converter adapted to receive an alternating current of a first voltage at the power supply terminals and to transform the alternating current into a direct current of a second voltage, the first voltage being larger than the second voltage. Advantageously, the first voltage is for example, 115 VAC, a common voltage of a power supply network in an aircraft, while the second voltage is for example, 28 VDC, commonly used for powering heaters and sensors.

According to one of various embodiments of the heating control unit, the heating control unit further comprises a sensor terminal coupled to the microcontroller, the sensor terminal being configured to connect a further temperature sensor external to the controller housing. This has the advantage of being able to couple an external sensor to the heating control unit, for example a TDA5 sensor. Such an external sensor may be used for components onto which the heating control unit cannot be directly applied.

According to yet another embodiment of the heating control unit, the heating control unit further comprises an electrical fault detection unit arranged in the controller housing, the electrical fault detection unit being coupled to the microcontroller and being configured to detect one or more of a ground fault, an earth leakage and an arc fault. This provides the advantage of guaranteeing the operational safety of the heating control unit against various types of electrical faults that might occur during operation of the heating control unit and the heater, and might otherwise present a hazard to the safety of the airborne vehicle.

According to yet another exemplary embodiment of the heating control unit, the heating control unit further comprises a wireless communication device coupled to the microcontroller and configured to provide wireless communication to and from the microcontroller. Advantageously, the wireless communication simplifies the maintenance and accessibility of a multitude of heating control units that may be positioned in hard to reach spots within the airborne vehicle during normal operation of the vehicle.

According to yet another embodiment of the heating control unit, the wireless communication device is configured to communicate with an RFID label attached to a component of the airborne vehicle. Advantageously, this enables heating control units to be manufactured off the shelf which configure themselves upon initiating wireless contact with the RFID label on a component for which the heating control units are employed.

According to yet another exemplary embodiment of various embodiments of the heating control unit, the heating control unit further comprises a status indicator arranged in a wall of the controller housing, the status indicator being configured to display an operation status of the heating control unit. This provides the advantage for a fast overview on the operational status of the heating control unit, in particular when the heating control unit is fixedly installed at a component in the airborne vehicle and thus otherwise difficult to test.

According to yet another embodiment of the heating control unit, the heating control unit further comprises a memory device interface coupled with the microcontroller, the memory device interface being configured to receive a memory device, for example, a flash memory data storage device, on which configuration data for the microcontroller and/or failure protocol data of the heating control unit are storable. Such a memory device interface renders it possible to use memory devices such as SD memory cards for easier configuration of the heating control units and for storing failure logs of defects and malfunctions for later evaluation.

According to yet another exemplary embodiment of the heating control unit, the heating control unit further comprises a bus interface arranged in the controller housing and coupled to the microcontroller, the bus interface being configured to provide a network connection to a network bus, for example, a CAN bus or a LIN bus. This way, the heating control units may be coupled to an existing wire-bound bus network on the airborne vehicle. Via the bus interface the microcontroller and/or the temperature sensor may be configured with regard to desired temperature control ranges, heating control ranges or similar parameters.

According to yet another embodiment of various embodiments of the heating control unit, the heating control unit further comprises at least one connection element for mechanically connecting the controller housing to a component of the airborne vehicle. Such clamping elements are particularly useful for clamping a modular heating control unit reliably and easily to components in the airborne vehicle such as water tubes or conduits.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

Figure 1:
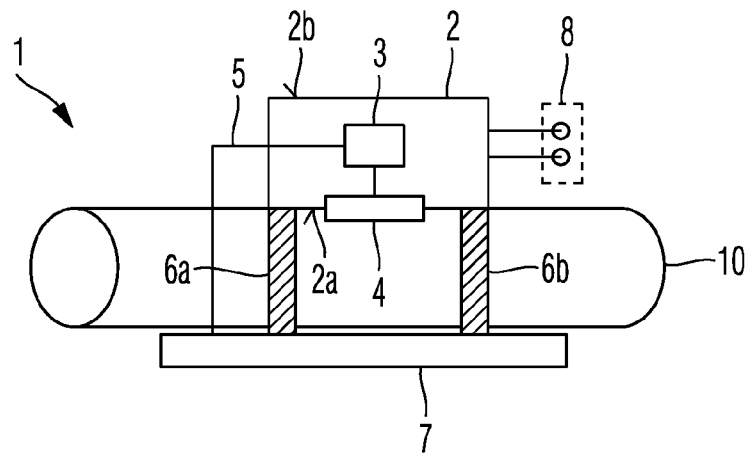
FIG. 1 shows a heating control unit for an airborne vehicle according to an exemplary embodiment of the present disclosure.

FIG. 1 shows a heating control unit 1, for example, a heating control unit 1 for use in an airborne vehicle such as an aircraft or spacecraft. The heating control unit 1 may be used for any component 10 in an airborne vehicle such as water lines, waste water lines, potable water lines, servicing panels, heated floor panels, wing flaps, sanitary installations, on-board galley sinks and equipment, and similar components commonly found in aircraft. An airborne vehicle may also have a plurality of heating control units for different components in the airborne vehicle. The plurality of heating control units 1 may be arranged in an ice protection system and may communicate among each other via a cabin intercommunication data system (CIDS), a Wireless Local Area Network (WLAN), a communication bus system such as a CAN-Bus or a LIN-Bus or through wireless communication, such as for example WLAN, WiMAX or similar radio communication means.

Figure 2:
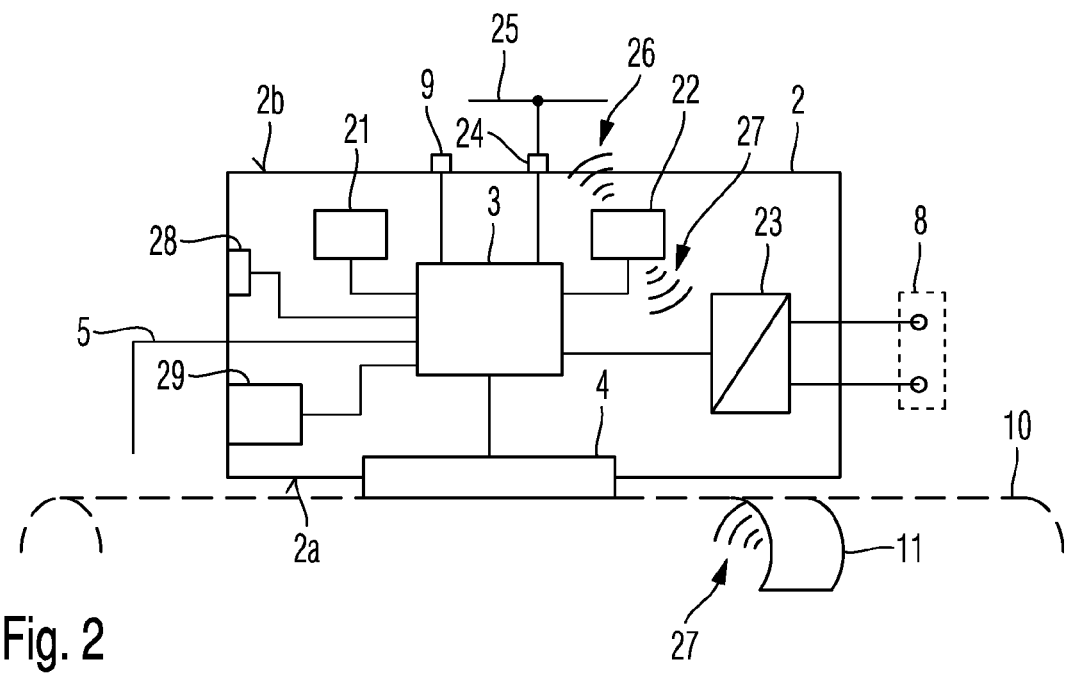
FIG. 2 shows a heating control unit in greater detail according to another exemplary embodiment of the present disclosure.

Reference is also made to FIG. 2 when explaining the technical details of FIG. 1 with FIG. 2 showing constructional illustrations of the heating control unit 1 of FIG. 1 in greater detail.

The heating control unit 1 may comprise a controller housing 2. The controller housing 2 may for example comprise a metallic material such as aluminum or a synthetic material. The controller housing 2 may have a lower controller housing surface 2a which may be facing the component 10 and an upper controller housing surface 2c opposite to the lower controller housing surface 2a.

Within the controller housing 2, a microcontroller 3 may be arranged, the microcontroller 3 being configured to generate a control signal for a heater 7. This control signal may be output via a control line 5 to the heater 7. The floor panel 10 may further comprise a heated panel 6 which is configured to heat the floor panel 10. The heater 7 may for example comprise an electric heating wire or an electric heating foil as a heater element, for example comprising MANGANIN®. The heater 7 may be used to heat the component 10 in order to prevent ice accretion or ice formation when the temperature of the component or fluids in the component below a critical temperature threshold.

The heating control unit 1 may further comprise a temperature sensor 4 arranged within the controller housing 2 and coupled to the microcontroller 3. The temperature sensor 4, for example a TDA5 sensor, may comprise an active sensor surface which forms at least part of the lower controller housing surface 2a of the controller housing 2. The heating control unit 1 may thus be placed on a component 10, the active sensor surface facing the component 10 and being able to gather a temperature value of the component 10. In the example of FIG. 1, the component 10 is a tube or a conduit for a fluid. The temperature sensor 4 is adapted to measure a temperature of the component 10 and to relay a respective temperature value signal to the microcontroller 3.

The heating control unit 1 may further comprise power supply terminals 8 for providing electrical power to the microcontroller 3 and the temperature sensor 4 which may be arranged in a wall of the controller housing 2. The power supply terminals 8 may be configured to couple the heating control unit 1 to a power supply system within the airborne vehicle. The power supply terminals 8 are adapted to facilitate the installation of the heating control unit 1 in the airborne vehicle by reducing the number of separate lines to be led through the airborne vehicle and the respective connections to be made. The power supply may for example be an 115 VAC power supply.

Within the controller housing, a voltage converter 23 may be coupled between the power supply terminals 8 and the microcontroller 3, the voltage converter 23 being configured to convert a voltage applied at the power supply terminals 8 to an operating voltage of the microcontroller 3. For example, the voltage converter 23 may comprise a mains converter configured to generate a 28 VDC from the 115 VAC input voltage. Of course, any other voltage values may be input to the power supply terminals 8 as well, and the voltage converter 23 may be designed to generate any other voltage values for supplying the microcontroller 3 and the temperature sensor 4 with power as well.

For detection of electric faults, the heating control unit 1 may for example comprise an electric fault detection unit 21 coupled to the microcontroller 3 and configured to detect one or more electric faults of the heating control unit 1. For example, undesired leakage currents may occur between electrical components of the heating control unit 1 and the aircraft structure to which the heating control unit 1 may be fixed. Such leakage currents may be detected by the electric fault detection unit 21 as difference between the currents carried on the power lines of the power supply terminals 8. A ground fault may be detected when the sum of the currents flowing is not zero, i.e. some current is flowing not on its dedicated path back to the electric power supply.

Alternatively or additionally, the electric fault detection unit 21 may be configured to detect an arc fault in the heating control unit 1. Both types of faults, ground faults and arc faults may endanger the safety of the heating control unit 1, thus with the electric fault detections unit 21 such electric faults may be detected early. Respective countermeasures may be implemented by the microcontroller 3. For example, in case of an electric fault, the power to the heater 7 may be shut down temporarily or continuously.

The microcontroller 3 may further be configured to store a protocol associated with electric faults detected by the electric fault detection unit 21 in a non-volatile flash memory data storage device. The data storage device may for example be an internal memory of the microcontroller 3. It may also be possible to provide a memory device interface 29 in the controller housing 2, for example an SD card slot, into which a flash memory data storage device such as an SD card may be inserted. The SD card may also be configured to store configuration data for the microcontroller 3 and/or the temperature sensor 4.

The microcontroller 1 may be configured to store a configurable temperature set point value or value range for the temperature sensor 4 and to control the heater 7 according to the temperature set point value or value range and a temperature value determined from the temperature sensor 4. A value for the temperature set point may for example be adjusted externally and transmitted to the microcontroller 3.

In order to communicate with the heating control unit 1 of the airborne vehicle, the heating control unit 1 may comprise a wireless communication device 22 coupled to the microcontroller 3 and configured to provide wireless communication 26 to and from the microcontroller 3. With such a communication device 22 is it possible to dispense with wire-bound data lines. It may alternatively be possible to route controller data as power line communication (PLC) data over the power supply terminals 8. As a further alternative or addition, the controller housing may have a bus interface 24 which may be coupled to a CAN bus or LIN bus of the airborne vehicle.

If a wireless communication device 22 is used, the heating control unit 1 may communicate with an RFID label 11 attached to the component 10. The wireless communication 27 may be used to determine the type of component 10 in the airborne vehicle and may determine the type of configuration the microcontroller 3 implements in order to control the heater 7.

The microcontroller 3 may further be configured to monitor the current in the heater 7, the temperature in the controller housing 2, and the functional state of the temperature sensor 4. In order to give an indication of the operational state of the heating control unit 1, a status indicator 28 may be provided in a wall of the controller housing 2. The status indicator 28 may for example comprise one or more colored LEDs.

The heating control unit 1 may further comprise a sensor terminal 9 coupled to the microcontroller 3, the sensor terminal 9 being configured to connect a further temperature sensor external to the controller housing 2, for example a further TDA5 sensor.

The heating control unit 1 may be part of an ice protection system in an airborne vehicle. One or several of the heating control units 1 may be coupled via a common data bus 25 or via wireless communication 26 such as WLAN or WiMAX. The floor heating system 21 may for example comprise a cabin information data system (CIDS) which may be coupled to one or more flight attendant panels (FAP) by means of which communication or controlling data may be gathered from or input to the microcontrollers 3 of the respective heating control units 1. For example, the set point of the temperature to be achieved by the heaters 7 may be set via a FAP. The microcontroller 3 may provide the CIDS via the data bus 25 or the wireless communication device 22 with diagnosis, repair and/or maintenance information. The microcontroller 3 may contain a built-in test equipment (BITE) that may be controlled via the CIDS.

The controller housing 2 may be provided with at least one connection element 6a and 6b for mechanically connecting the controller housing 2 to the component 10 of the airborne vehicle. For example, the connection elements 6a and 6b may be mechanical clamps intended to removably clamp the controller housing 2 to a tube or conduit 10.

Figure 3:
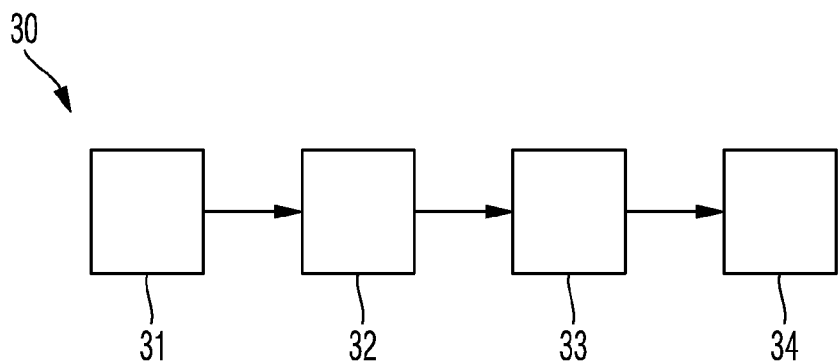
FIG. 3 shows a method of controlling a heater in an airborne vehicle according to yet another exemplary embodiment of the present disclosure.

FIG. 3 schematically illustrates a method 30 of controlling a heater, for example, a heater 7 as shown in conjunction with FIGS. 1 and 2. The method 30 may for example be used with a heating control unit 1 as explained above. The method may comprise at 31 arranging a microcontroller 3 within a controller housing 2. At 32, arranging a temperature sensor 4 within the controller housing 2 may be performed, such that an active sensor surface of the temperature sensor 4 forms at least part of an outer surface 2a of the controller housing 2.

With the microcontroller 3 a control signal dependent on a sensor value of the temperature sensor 4 may be generated at 33. Finally, at 34, the microcontroller 3 may output the control signal via a control line 5 to a heater 7 for heating a component 10 of an airborne vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A heating control unit for an airborne vehicle, comprising:
   a controller housing;
   a microcontroller arranged within the controller housing, the microcontroller being configured to control a heater;
   at least one connection element for mechanically connecting the controller housing to a tube or conduit of the airborne vehicle; and
   a temperature sensor arranged within the controller housing and coupled to the microcontroller, the temperature sensor being adapted to measure a temperature of the tube or conduit of the airborne vehicle and to relay the respective temperature value signal to the microcontroller;
   wherein an active sensor surface of the temperature sensor forms at least part of an outer surface of the controller housing.

2. The heating control unit of claim 1, further comprising:
   power supply terminals for providing electrical power to the microcontroller and the temperature sensor; and
   a voltage converter coupled between the power supply terminals and the microcontroller, the voltage converter being configured to convert a voltage applied at the power supply terminals to an operating voltage of the microcontroller.

3. The heating control unit of claim 2, wherein the voltage converter is a mains converter that receives an alternating current of a first voltage at the power supply terminals and transforms the alternating current into a direct current of a second voltage, the first voltage being larger than the second voltage.

4. The heating control unit of claim 1, further comprising:
   a sensor terminal coupled to the microcontroller, the sensor terminal being configured to connect a further temperature sensor external to the controller housing.

5. The heating control unit of claim 1, further comprising:
   an electric fault detection unit arranged in the controller housing, the electric fault detection unit being coupled to the microcontroller and being configured to detect one or more of a ground fault, an earth leakage and an arc fault.

6. The heating control unit of claim 1, further comprising:
   a wireless communication device coupled to the microcontroller and configured to provide wireless communication to and from the microcontroller.

7. The heating control unit of claim 6, wherein
   the wireless communication device is configured to communicate with an RFID label attached to a component of the airborne vehicle.

8. The heating control unit of claim 1, further comprising:
   a status indicator arranged in a wall of the controller housing, the status indicator being configured to display an operation status of the heating control unit.

9. The heating control unit of claim 1, further comprising:
   a memory device interface coupled with the microcontroller, the memory device interface being configured to receive a memory device on which at least one of configuration data for the microcontroller and failure protocol data of the heating control unit are storable.

10. The heating control unit of claim 1, further comprising:
    a bus interface arranged in the controller housing and coupled to the microcontroller, the bus interface being configured to provide a network connection to a network bus.

11. The heating control unit of claim 9, wherein the memory device interface is a flash memory data storage device.

12. The heating control unit of claim 10, wherein the network bus is a CAN bus or a LIN bus.

13. An ice protection system for an airborne vehicle, comprising:
    a plurality of heating control units, each of the plurality of heating control units including a controller housing, a microcontroller arranged within the controller housing for controlling a respective one of a plurality of heaters, at least one connection element for mechanically connecting the controller housing to a tube or conduit of the airborne vehicle, a temperature sensor arranged within the controller housing and coupled to the microcontroller, the temperature sensor being adapted to measure a temperature of the tube or conduit of the airborne vehicle and to relay the respective temperature value signal to the microcontroller and having an active sensor surface that forms at least part of an outer surface of the controller housing; and
    the plurality of heaters, each of the plurality of heaters being electrically connected and supplied with electrical power by a respective one of the plurality of heating control units, the plurality of heaters being configured to heat a respective component of an airborne vehicle.

14. The ice protection system of claim 13, wherein the components of the airborne vehicle are selected from the group comprising: water lines, waste water tubes, potable water tubes, servicing panels and heated floor panels.

15. An airborne vehicle, comprising:
    at least one of a water line, a waste water tube, a potable water tube, a servicing panel and a floor panel;

an ice protection system for heating the at least one water line, waste water tube, potable water tube, servicing panel or floor panel, the ice protection system including:

at least one heating control unit, the at least one heating control unit including a controller housing, a microcontroller arranged within the controller housing for controlling at least one heater, at least one connection element for mechanically connecting the controller housing to the at least one water line, waste water tube, potable water tube, servicing panel or floor panel, and a temperature sensor arranged within the controller housing and coupled to the microcontroller, the temperature sensor being adapted to measure a temperature of the at least one water line, waste water tube, potable water tube, servicing panel or floor panel and to relay the respective temperature value signal to the microcontroller and having an active sensor surface that forms at least part of an outer surface of the controller housing; and the at least one heater electrically connected and supplied with electrical power by the at least one heating control unit, the at least one heater for heating the at least one water line, waste water tube, potable water tube, servicing panel or floor panel.

16. The airborne vehicle of claim 15, further comprising:

power supply terminals for providing electrical power to the microcontroller and the temperature sensor; and a voltage converter coupled between the power supply terminals and the microcontroller, the voltage converter being configured to convert a voltage applied at the power supply terminals to an operating voltage of the microcontroller.

17. The airborne vehicle of claim 15, further comprising:

a status indicator arranged in a wall of the controller housing, the status indicator being configured to display an operation status of the heating control unit.

18. The airborne vehicle of claim 15, further comprising:

a wireless communication device coupled to the microcontroller and configured to provide wireless communication to and from the microcontroller.

19. A method of controlling a heater for a tube or conduit of an airborne vehicle, comprising:

arranging a microcontroller within a controller housing;

arranging a temperature sensor within the controller housing such that an active sensor surface of the temperature sensor forms at least part of an outer surface of the controller housing;

mechanically connecting the controller housing to a tube or conduit of an airborne vehicle;

measuring, by the temperature sensor, a temperature of the tube or conduit;

relaying the measured temperature in a temperature value signal to the microcontroller;

generating, by the microcontroller, a control signal dependent on the relayed temperature value signal; and outputting, by the microcontroller, the control signal via a control line to a heater for heating the tube or conduit of the airborne vehicle.

* * * * *